United States Patent
Aleksic et al.

(10) Patent No.: US 6,658,531 B1
(45) Date of Patent: *Dec. 2, 2003

(54) METHOD AND APPARATUS FOR ACCESSING GRAPHICS CACHE MEMORY

(75) Inventors: Milivoje Aleksic, Richmond Hill (CA); James Yee, Willowdale (CA); Hon Ming Cheng, Scarborough (CA); John DeRoo, Hopkinton, MA (US); Andrew E. Gruber, Arlington, MA (US)

(73) Assignee: ATI International SRL, Christchurch (BB)

( * ) Notice: Subject to any disclaimer, the term of this patent is extended or adjusted under 35 U.S.C. 154(b) by 0 days.

This patent is subject to a terminal disclaimer.

(21) Appl. No.: 09/614,931

(22) Filed: Jul. 12, 2000

Related U.S. Application Data (63) Continuation of application No. 09/314,210, filed on May 19, 1999, now Pat. No. 6,173,367.

(51) Int. Cl.[7] .......................... G06F 12/00; G06F 13/00
(52) U.S. Cl. ....................... 711/129; 711/130; 711/150; 711/152; 711/163; 345/533; 345/542; 345/544; 345/549; 345/557

(58) Field of Search .................. 711/128–131, 149–153, 711/163, 145, 168; 365/189.01, 189.04; 345/533, 541–542, 544, 547, 554, 557–558

(56) References Cited

U.S. PATENT DOCUMENTS

| | | | | |
|---|---|---|---|---|
| 4,736,293 A | * | 4/1988 | Patrick | 364/200 |
| 4,905,141 A | * | 2/1990 | Brenza | 364/200 |
| 5,640,534 A | * | 6/1997 | Liu et al. | 711/146 |
| 5,717,893 A | * | 2/1998 | Mattson | 711/129 |
| 5,790,883 A | * | 8/1998 | Sugita | 710/1 |
| 5,875,464 A | * | 2/1999 | Kirk | 711/129 |
| 5,996,051 A | * | 11/1999 | Mergard | 711/147 |

* cited by examiner

Primary Examiner—Reginald G. Bragdon
Assistant Examiner—Pierre M. Vital
(74) Attorney, Agent, or Firm—Vedder, Price, Kaufman & Kammholz, P.C.

(57) ABSTRACT

A method and apparatus for utilizing a data cache in a system with both 2D and 3D graphics applications. In a specific embodiment of the present invention, a mode signal is received by the video system indicating whether a 2D or 3D application is to be used. Depending on the mode signal, either as a unified cache capable of being accessed by two separate data access streams, or two independent caches, each accessed by one data access stream.

13 Claims, 5 Drawing Sheets

METHOD AND APPARATUS FOR ACCESSING GRAPHICS CACHE MEMORY

RELATED APPLICATIONS

The present application is a continuation of U.S. patent application Ser. No. 09/314,210, entitled METHODS AND APPARATUS FOR ACCESSING GRAPHICS CACHE MEMORY, filed May 19, 1999, the entire disclosure of which is hereby incorporated by this reference, now U.S. Pat. No. 6,173,367.

A copending application has been previously filed. The application is entitled "Methods for Assuring Cache Coherency," has an application number of Ser. No. 09/026,942, a filing date of Feb. 20, 1998, at least one common inventor with the present application; and is assigned to the same assignee as the present application, now U.S. Pat. No. 6,295,581.

FIELD OF THE INVENTION

The present application relates generally to the use of a cache memory, and more specifically relates to a method and apparatus for accessing a video data cache memory.

BACKGROUND OF THE INVENTION

Computers are known to include a central processing unit, audio processing circuitry, peripheral ports, video graphics circuitry, and system memory. Video graphic controllers, which include cache memory, are utilized in computers to process images for subsequent display on a display device. Display devices include computer monitors, televisions, liquid crystal display panels, and any other device capable of visually displaying pixel information. The cache memory is used to improve performance of computer systems by temporarily storing data in memory devices that allow for high-speed data access as compared to data retrieved from other lower speed memory devices such as system memories, disks, or tapes. Cache memory is generally used as temporary storage for recently or frequently used data. The use of cache memories allow data processors to access data at a higher rate than that generally available through memories associated with the systems. This avoids the latency times associated with accessing low speed memories.

Current video graphic systems need to support both two-dimensional (2D) and three-dimensional (3D) applications. Generally, memory supporting 2D graphics, including cache memories, would be mapped such that there would be a direct relationship between pixel location and memory location. For example, two 8-bit bytes could be used to represent a single pixel, or a single 128-bit word could be used to represent 8 adjacent pixels, each pixel having two bytes of associated memory. A system optimized to support 2D graphics would generally have a single cache with two or more independent ports, wherein recent direct mapped memory accesses could be stored. However, a system optimized for 2D graphics application would not necessarily be advantageous for a 3D graphics application.

3D graphics applications add additional dimensions of complexity to the video controller in order to quickly calculate 3D images. Each visual element associated with 3D graphics needs not only its 3D shape information, but additional shading information, or Z data, reflection information, and the Z-plane information. For example, the Z-plane information represents the plane where a specific element is with reference to other elements being rendered. For example, if a person and a house were to be illustrated in 3D form, it is necessary to know whether or not the person is standing in front of the house or behind the house. This information is carried by Z data information.

Z data information is used by the graphics engine in order to determine what elements are actually visible on the monitor. Once the Z data information, and other 3D information, has been used to determine what will be displayed on the monitor, it is possible to write data associated with those items that are to be displayed to a direct mapped memory location. In fact, handling Z data information as well as displaying pixel information are two very memory-intensive processes in the rendering pipeline. This is different than the nature of 2D graphics which have a significant percentage of "copy" operations, which can be broken down into a read process and display process, wherein a clients perform read and writes to memory. In 3D applications, speed is optimized if each process is treated as a separate client and has its own dedicated port to the cache.

Therefore, it would be desirable to have a video cache capable of supporting the requirements of both 2D graphics and 3D graphics.

It should be understood that the figures illustrate specific embodiments of the present invention, and are not meant to be inclusive of all possible embodiments. Furthermore, it should be understood that the elements are not necessarily drawn to scale or proportionally to represent layouts or any other relationships relating to actual characteristics of a final implementation.

DETAILED DESCRIPTION OF THE DRAWINGS

Generally, the present invention provides a method and apparatus for utilizing a data cache in a system for supporting both 2D and 3D graphics applications. In a specific embodiment of the present invention, a mode signal is received by the video system, whereby the data cache is utilized either as a unified cache with each entry capable of being accessed by two separate data access streams, or the cache is divided into two portions with each portion being accessed by only one data access stream. The present invention allows the advantage of configuring the cache to be a unified cache when operating in 2D mode, and as separate caches, to support independent data types, when in 3D mode.

Figure 1:
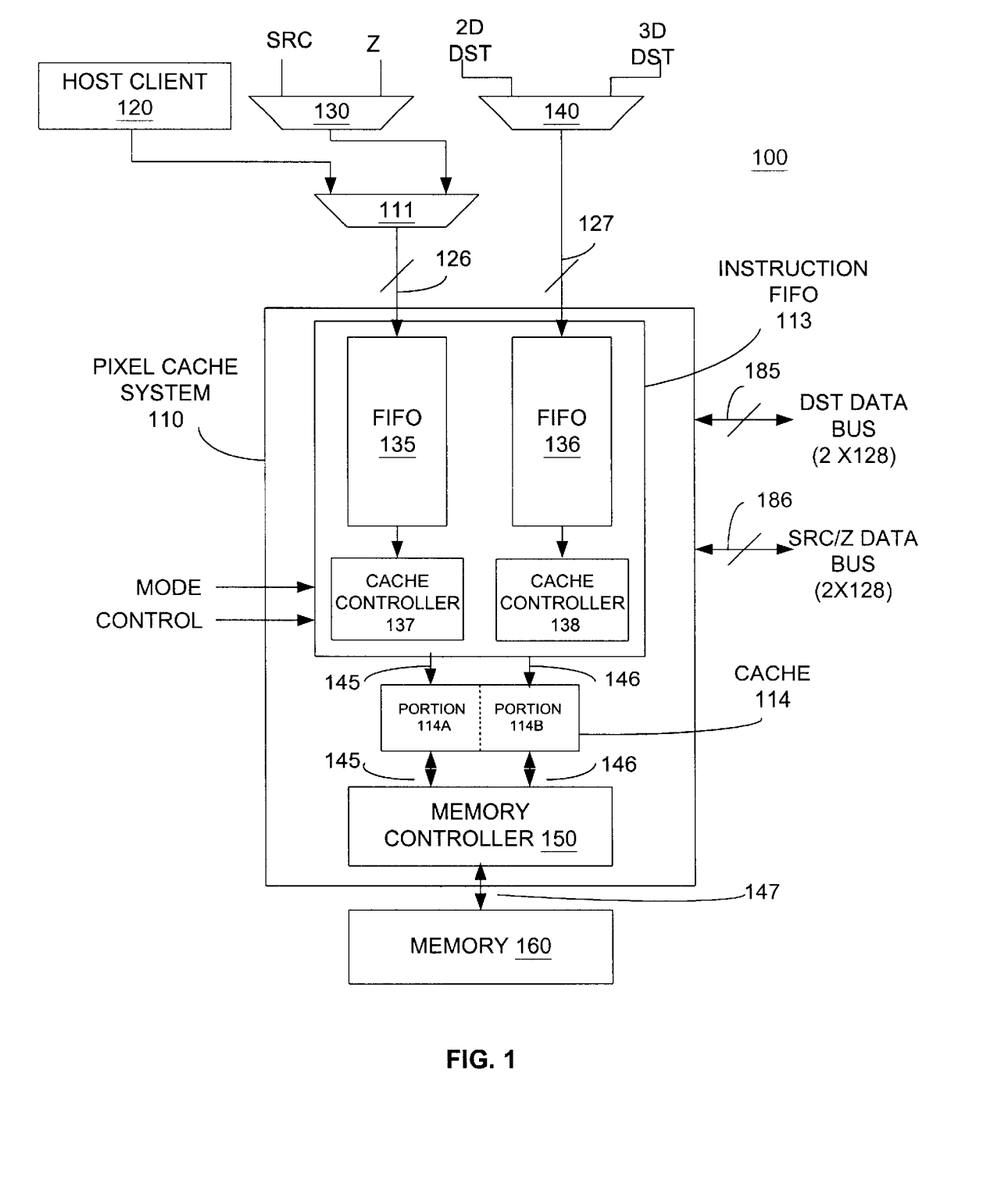
FIG. 1 illustrates in block diagram form a portion of a video system for accessing cache in accordance with the present invention.

FIG. 1 represents a specific embodiment of a portion of a system 100 that represents video system 100. The system 100 receives specific client requests, includes a Pixel Cache System 110, and a Memory 160. In the embodiment illustrated, the video clients requesting service by the video system 100 include a video source (SRC) client, a video Z data client (Z), a 2D video destination (2D DST) client, and a 3D video destination (3D DST) client. In addition, a Host Client 120, which is not necessarily a video client, also provides a request to the system 100. The Host Client 120 provides access to the cache and memory of the video system 100 via a host path.

The client requests are multiplexed in order to create two access streams to the Pixel Cache System 110. The access streams are transmitted over bus 126 and 127 and are referred to herein as access streams 126 and 127. As illustrated in FIG. 1, the SRC and Z data requests are multiplexed through a multiplexor 130 to provide a single address and control bus to a second multiplexor 111. The multiplexor 130 receives a mode signal (not illustrated) for selecting between the SRC and Z client. The Host Client 120 provides a second input to the multiplexor 111. A host access signal (not shown) selects between the SRS/Z clients and the Host Client 120. The multiplexor 111 provides the address and control signals from the selected client to the Pixel Cache System 110 over bus 126.

A second address and control channel is received at the Pixel Cache System 110 by the multiplexor 140. The multiplexor 140 receives the 2D request from a 2D video destination client, and the 3D request from a 3D destination client. In addition, the multiplexor 140 receives a mode select signal (not shown) for selecting between the 2D and 3D requests.

The mode select signal labeled MODE is generated by the host or video graphics system in response to the type of graphics being generated. When 2D graphics are being generated, the MODE signal will select a 2D mode. In 2D mode, the SRC client request and the 2D DST request are selected and provided at the outputs of the respective multiplexors 130 and 140. When in 3D mode, the Z-client request and the 3D destination client requests are provided at the outputs of the multiplexors 130 and 140 respectively. The 2D and 3D DST requests, when selected by the mode signal, are provided to the Pixel Cache System 110. The SRC and Z client data, when selected by the mode signal, are provided to the multiplexor 111. The multiplexor 111 is used to further select between the output of the multiplexor 130, and the output of the host path data. In one embodiment, the select signal for multiplexor 111 is provided by the host, which will generate a host access signal as needed. In other embodiments, the select signal for the host path can be arbitrated by the system 100 as needed.

The Pixel Cache System 110 receives two access request channels 126 and 127. In one embodiment, each channel represents a single address bus and associated control signals specifying an address to be accessed by a specific read or write operation. In another embodiment, the channels 126 and 127 represent separate read and write address buses and the necessary control signals associated with each of the channels.

Access requests from channels 126 and 127 are received by the Pixel Cache System 110. In response, the Pixel Cache System 110 will access Memory 160, as needed, to provide the data to the appropriate 2D/3D DST data buses and the SRC/Z data buses. Note that in the embodiment shown, each data bus 185 and 186 represent two 128-bit buses, one for read operations and one for write operations. Therefore, each requesting channel 126, and 127 are supported by separate read and write data buses. It should be understood that single buses of varying sizes can be used to support the read and write operations of the channels 126 and 127. The buses 185 and 186 also include control as necessary to interface to the requesting clients. It should be further noted, that in other embodiments, there can be additional data buses, for example there may be a dedicated data bus to provide data back to the Host Client 120.

The Pixel Cache System 110 further comprises instruction FIFO 113, a Cache 114, and a Memory Controller 150. The instruction FIFO 113 further includes a FIFO 135, and a FIFO 136, Cache Controller 137, and Cache Controller 138. Requests relating to channel 126 are received by the FIFO 135. Requests relating to FIFO 135 are output to the Cache Controller 137, which in turn is connected to the Cache 114 and to the Memory Controller 150. Likewise, the channel 127 provides requests to the FIFO 136. In turn, the FIFO 136 provides its requests to the Cache Controller 138 to process requests. The Cache Controller 138 is connected to the Cache 114 and the Memory Controller 150. The Memory Controller 150 is connected to the Memory 160. Note that the Memory 160 is illustrated as external to the Pixel Cache System 110. Generally, there will be memories associated with the Pixel Cache System 110 that are external to the system, however, in other embodiments there may be integrated memories associated with the pixel cache system. In addition, the Memory Controller 150 and Cache Controllers 137 and 138 may be integrated into a common control block.

In operation, the FIFOs 135 and 136 receive and issue a plurality of access requests from channels 126 and 127, respectively. In one embodiment, the actual accessing of data requested by FIFO 135 and 136 is handled by Cache Controllers 137 and 138 respectively, which determine whether the requested data is readily available in cache, or if it must be accessed from external Memory 160.

The Cache Controllers 137 and 138 provide access control to both the Cache 114, and the Memory Controller 150. Note that in other embodiments, Memory Controller 150 can actually be incorporated within portions of the Cache Controllers 137 and 138. In another embodiment, the Memory Controller 150 would issue the access requests, or instructions necessary to access the Memory 160 when a cache miss occurs. When a miss occurs, the Memory Controller 150 accesses the Memory 160 and provides the requested data back to the Cache 114 as appropriate. In other embodiments, the cache hit/miss determination is performed before the FIFOs, such that modified instructions are sent to the FIFOs in order to access data in its current location.

During 3D mode, the Cache 114 is split into two portions. A first cache portion 114A and a second cache portion 114B. Generally, the cache portions 114A and 114B are equally divided such that each portion has the same number of memory locations. However, one skilled in the art will recognize that other divisions of cache can be utilized. The first cache portion 114A is accessed by Cache Controller 137 in response to requests issued by FIFO 135. Accessed results are placed on the Z data bus when Z data is selected, or to the host path when the host path is selected.

Likewise, the FIFO 136, and the Cache Controller 138 access the second cache portion 114B in order to service destination client requests stored in FIFO 136. Dividing the cache into the portions 114A and 114B allows for different data types used to support 3D graphics to have dedicated caches to optimize their accesses.

When in 2D mode, controllers 137 and 138 can access data within the Cache 114 through different ports. Generally, this is accomplished by implementing the Cache 114 using a two-ported memory. However, it is necessary for the Cache Controllers 137 and 138 to have visibility of each other's pending accesses to ensure a collision to the exact same data location does not occur. When a collision does occur, the requests will have to be arbitrated by having one of the requests delayed, or by using a memory capable of supporting an access to identical memory locations.

In addition, an embodiment where the Cache Controllers 137 and 138 have visibility to the other FIFO's requests is advantageous in that it ensures coherency of the Cache. For example, if Cache Controller 137 is about to write to a specific cache location X, where X is an address referencing a specific line of cache, it will be possible for the Cache Controller 137 to determine if any pending read requests to location X in FIFO 136 are pending. If a request pending in FIFO 136, or Cache Controller 138 is attempting to read data at the same location being currently written to by Cache Controller 137, it will be necessary to let the pending read instructions to issue before allowing the write from controller 137 to issue. Therefore, the Cache Controller 137 would stall the write request, while operation of the FIFO 136 and the Cache Controller 138 would continue normally. In order to ensure a non-resolvable conflict does not occur, no new instructions should be allowed to enter the FIFO 136 until the write access being delayed in Cache Controller 137 has been issued.

Referring again to FIG. 1, a separate control line labeled CONTROL is received by the FIFO portion 113 from external to the Pixel Cache System 110. This control line is capable of implementing host and video system requests. For example, it may be desirable to flush the Cache 114, this can be accomplished using the control line. In addition, it may be desirable to issue a flush whenever a vertical synch signal is received by a video system. In addition, the control line could be used to handle overhead associated with switching from 3D to 2D or 2D to 3D mode. For example, when switching from a 2D mode to 3D mode, it may be desirable to actually purge the entire cache. This purge operation would erase and invalidate the data stored. During a switch from 3D to 2D operation, in a specific embodiment, no specific flush operation need occur.

When in 2D mode both the Cache Controllers 137 and 138 will have visibility to the entire Cache 114. The Cache 114 is operating as a unified cache when in 2D mode. As a unified cache, all data locations in the Cache 114 are accessible to both Cache Controllers 137 and 138. As a unified cache, each of the clients has access to the entire pixel map.

Figure 2:
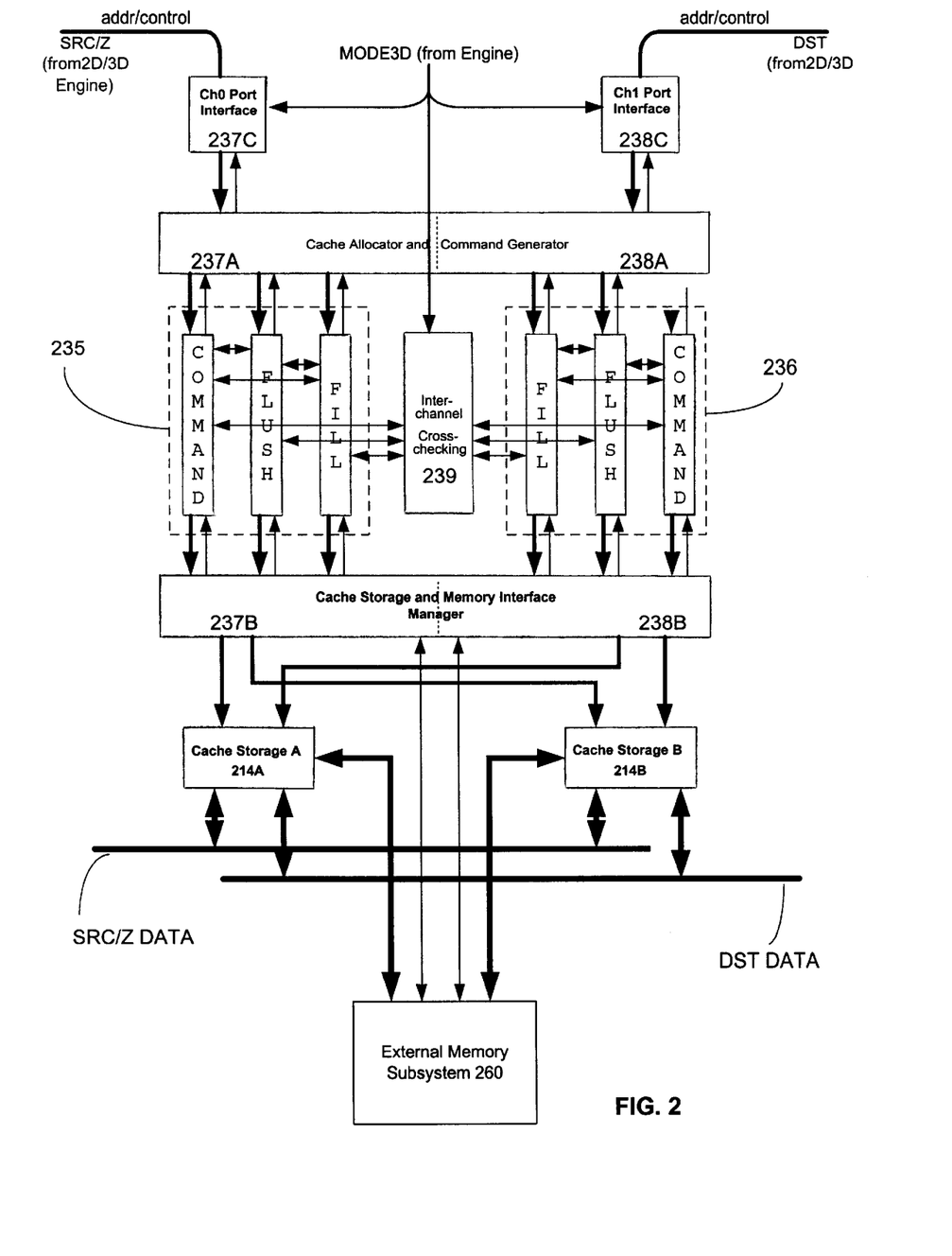
FIG. 2 illustrates a block diagram in greater detail for accessing cache in accordance with the present invention.
Figure 3:
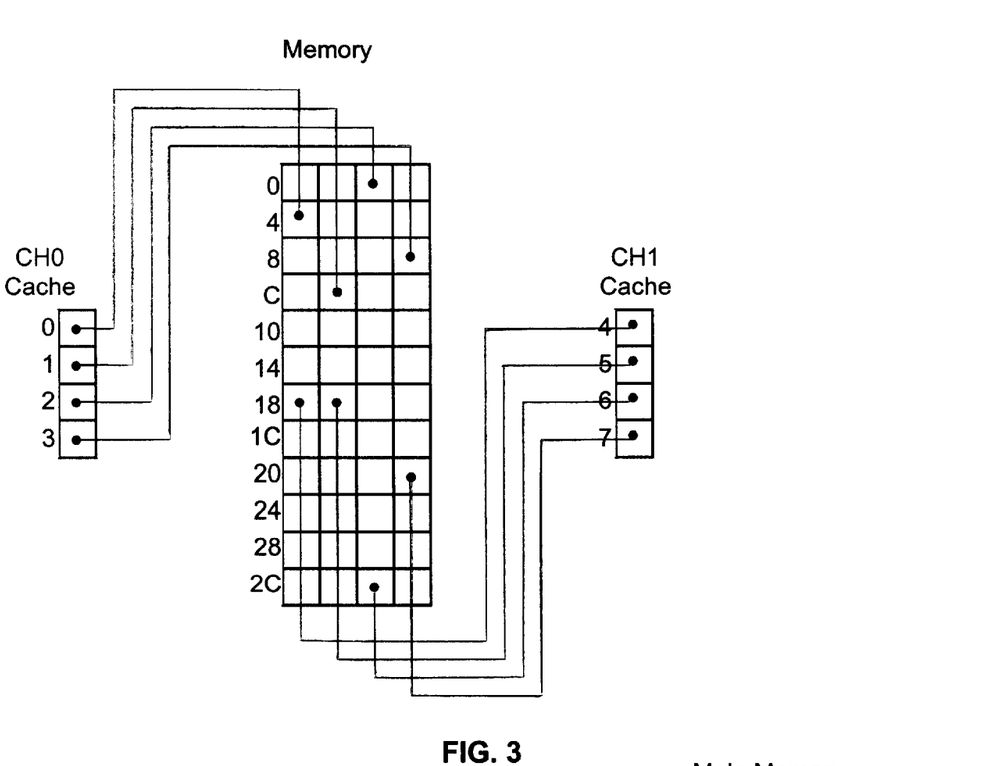
FIG. 3 illustrates in block form memory locations being accessed in accordance with the present invention.
Figure 4:
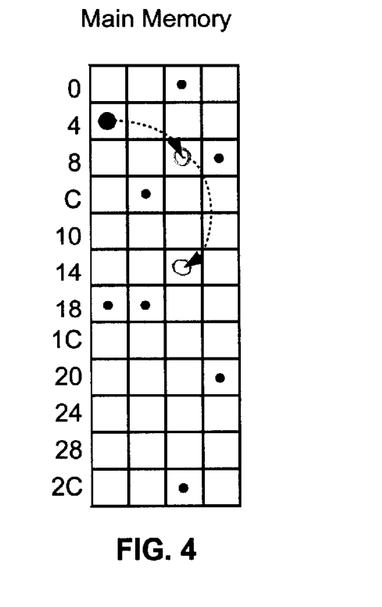
FIG. 4 illustrates, in block form, memory locations being accessed in accordance with the present invention.

FIGS. 2, 3, and 4 are used to further illustrate the present invention. Elements of FIG. 2 related to elements of FIG. 1 are similarly numbered. For example, CH0 Port Interface 237c would be included in Cache controller 137 of FIG. 1.

The graphics rendering engine (not shown) interfaces with the caching system over two separate physical ports. During 2D operation CH0 Port Interface 237c services the multiplexed SRC client (not shown), and during 3D operation Z client (not shown) is serviced. While CH1 Port Interface 238c services the DST client (not shown) for both 2D and 3D operations. Note that the ports CH0 and CH1 are related to the Cache Controllers 137 and 138 of FIG. 1, and furthermore, that the clients send memory addressing and Read/Write indication to the top of the caching system while the read and write data buses are connected at the bottom of the cache. The rendering engine also directs the cache to enter 2D or 3D mode using the signal labeled MODE3D which is represented in FIG. 1 by the signal labeled MODE. The cache interfaces to the Memory Subsystem 260, which relates to Memory 160 of FIG. 1.

The Cache Ports 237c and 238c receive the address and read/write information from the SRC/Z and DST clients. In a specific embodiment, these ports implement traffic control functions for the clients by restricting entry into the cache when necessary in order to maintain the integrity of the data as previously discussed.

The Cache Allocator and Command Generator block 237a/238a keeps track of those locations in Memory 260 that are presently mapped into the cache storage blocks 214, and which locations in Cache 214 to flush and deallocate for the next cache miss. The Cache Allocator And Command Generator 237a/238a performs the above functions by taking the client memory-specific operations and translating them to simpler FILL, FLUSH and cache COMMAND operations.

The term "FILL" relates to the process where one or more location from Memory 260 is read and stored inside local cache storage. The term "FLUSH" can be used to describe the process where a location in the cache storage is written back to Memory 260. Once a cache location has been flushed, it can be reallocated to map to a new area of Memory 260. The "cache COMMAND" can be a cache read, cache write or both read and write simultaneously. Typically, the initial client memory read/write is translated to an equivalent cache read/write after the appropriate re-mapping of cache locations by the Cache Allocator and Command Generator 237a/238a.

The instruction FIFOs 235 and 236 are related to the FIFOs 135 and 136 of FIG. 1. Each FIFO contains a FILL, FLUSH and cache COMMAND FIFO as indicated. The purpose of the FIFOs is to buffer the primitive operations (which tend to be suitable for burst operations) generated by the Cache Allocator Block 237a/238a so that the circuitry downstream will receive a steady stream of operations. Each of the individual FIFOs 235 and 236 have their own internal cross-checking circuitry to ensure that primitive operations, within the context of the overall operation, are passed downstream as independently as possible to maximize performance but not lose the sequencing required for overall data integrity. This will be elaborated upon later. The Inter-Channel Cross-Checking block 239 performs much of the same cross-checking as the internal cross checking but is applied between FIFOs 235 and 236. This inter-FIFO cross-checking is enabled for 2D operations but disabled for 3D operations.

The Cache storage and Memory Interface Manager block 237b/238b provides the low-level mechanics required to transfer data between Cache 214 storage and the Memory Subsystem 260, as well as between the client data buses (SRC/Z DATA, and DST DATA) and the Cache 214.

The 3D case is discussed herein first because, from the cache's point-of-view, it is actually simpler. The specific example below with reference to 3D mode refers to FIGS. 2 and 3. The cache of FIG. 2 can be thought of as two independent single channel caches whose operations are covered in pending U.S. patent application having Ser. No. 09/026,942 which is hereby incorporated by reference. In 3D mode, the signal MODE3D from the graphics rendering engine is asserted.

For simplification, FIG. 3 assumes that each channel in the cache is direct-mapped and holds four locations. Main memory has 48 locations. FIG. 3 illustrates the initial mapping of the cache with respect to main memory. Also, the cache illustrated has a "Write-back" policy. That is, main memory is not updated on cache write hits until that cache location is being reallocated to a different memory location or the cache is explicitly flushed. The Z client issues the following client requests to memory:

1. Memory Read address=0×9
2. Memory Write address=0×9; data=A
3. Memory Write address=0×5; data=B The memory address and Read/Write indication is received on the channel CH0 Port Interface 137c and passed down to the Cache Allocator and Command Generator block, 237a/238a. The Cache Allocator Block 237a/238a consults its internal mapping table and generates three sets of primitive operations. All operations within a set are generated concurrently as discussed in the following.

As illustrated in FIG. 3, memory address=0×9 is not presently mapped to cache and therefore, it must cast off the location mapped to that location in Cache 114. In this case, that would be cache address 0×1 presently mapped to memory address=0×D. Note that since each cache storage block has four elements and external memory is represented as an 12×4 array, a location in column n of external memory would map into row n of one of the cache storage blocks. In the previous example, memory locations 0×9 and 0×D are both situated in column 1 of external memory and would therefore both contend for location 0×1 in the direct-mapped cache. Also, a primitive operation to FILL the cache address=0×1 with memory address=0×9 is generated. The primitive cache COMMAND operation to Read cache address=0×9 is taken directly from the client Read indicator.

For client request 2, the Cache Allocator 237a/238a determines that memory address=0×9 is now mapped into the cache simply issues a cache COMMAND write to cache address=0×1.

For the third client request, cache address 0×1 must again be flushed so that memory address=0×5 may be re-mapped. Table 1 below summarizes the primitive operations generated by the cache allocator block in response to the Z client requests.

TABLE 1

3D Example Generated Primitive Operations

| Z Client Request | Generated Primitive Operations |
| --- | --- |
| 1. Memory Read address = 0 × 9 | (a) Flush Cache Address = 0 × 1 to Memory Address = 0 × D |
| | (b) Fill Cache Address = 0 × 1 from Memory Address = 0 × 9 |
| | (c) Read Cache Address = 0 × 1 |
| 2. Memory Write address = 0 × 9 | (a) Write Cache Address = 0 × 1 |
| 3. Memory Write address = 0 × 5 | (a) Flush Cache Address = 0 × 1 to Memory Address = 0 × 9 |
| | (b) Write Cache Address = 0 × 1 |

The generated primitive operations from the Cache Allocator and Command Generator 237a/238a are dropped down the corresponding FILL, FLUSH, and COMMAND FIFOs of FIFO 135. The individual FILL, FLUSH, and COMMAND FIFOs ensure proper sequencing by checking the contents of the other FIFOs within the same channel 135. In the example of FIGS. 2 and 3, the fill operation 1b of Table 1 must wait for the Flush operation 1a of Table 1 to complete.

The cache read operation 1c must wait for the Fill operation 1b to complete. The cache write of operation 2a must wait for the cache read of 1c to complete. The flush operation 3a must wait for the cache operations 1c and 2a to complete. Finally, the cache write operation associated with 3b must wait for the flush operation of 3a to complete.

The cache storage and Memory Interface Manager 237b/238b receives the primitive operations from the FIFOs and performs the required hardware interfacing to swap data into and out of cache back to memory. The Interface Manager 237b/238b also takes write data from the external client write data buses and writes to the appropriate cache location and conversely, provides read data back to the client read data buses from the appropriate cache location. Going back to the original Z client requested memory operations, the first read request to memory address=0×9 was fulfilled when that location was filled from external memory to cache (primitive operation 1b of Table 1) and then read from cache (primitive operation 1c of Table 1) and returned to the Z client via its read data bus. The second client request, write to memory address=0×9, was accomplished when the data content "A" was taken from the Z write data bus and placed into cache (primitive operation 2a of Table 1) and then subsequently flushed to external memory (primitive operation 3a of Table 1). The third client operation is still in progress as the write data "B" is still sitting in cache (after primitive operation 3b of Table 1). This location will be flushed eventually to complete the memory write operation.

In 3D mode, the DST client would interface with CH1 Port Interface 238c in an identical fashion. Again, there are no interactions between the two channels and the two-channel cache acts effectively as two single-channel caches.

Unlike 3D mode, having access to the entire Cache 114 is useful in 2D mode when the Cache 114 will generally contain mapped representations of two-dimensional images. For example, a two dimensional icon, such as a folder icon would have specific memory locations in the Cache 114 representing it appearance. When the icon is moved by a user to a different location on the desktop the 2D destination client request can be used to copy the representation of the icon from one location within the Cache 114 to another, regardless of wherein cache the icon representation exists. This allows for quick manipulation of 2D graphics stored anywhere in the Cache 114.

2D graphics operation is further described with reference to FIGS. 2, 3, and 4. For 2D operations, in addition to the intra-channel cross-checking mechanisms required for 3D operations previously discussed with reference to FIG. 2, cross-checking between channels is also required. The following 2D example uses two back-to-back copy operations to illustrate the operation of the cache of FIG. 2. A 2D copy operation involves replicating a group of pixels in one area of memory to a second area of memory. In this case, the CH0 237c SRC client performs a series of read operations from the first area of memory while the DST client takes the data obtained by the SRC client and writes to the second area of memory. Clearly, since the two clients operate concurrently in a common memory space, the two channels of the cache have to be aware of what the other channel is doing.

Again, to simplify explanation, each channel is directed-mapped (it should be understood that in real-life applications, 2-way set associatively or higher is generally used) and holds four cache locations. The initial mapping of the cache is illustrated in FIG. 3. Assume that the rendering engine (not shown) issues two consecutive 2D copy operations. To prepare the cache for these operations, the engine de-asserts the MODE3D signal to indicate 2D operation. This enables the inter-channel cross-checking block 239, which is a portion of one or both of the Cache Controllers 137 and 138 of FIG. 1 and circuitry in both port interfaces, 1. Assume that the first copy operation involves moving the contents of memory location address=0×4 to memory location address=0×A. This is followed immediately by a copy of the contents in memory address=0×A to memory address=0×16. See FIG. 4. Please note that moving only one location is not typical in real life but is used here for illustration purposes.

In the 2D environment, the rendering engine multiplexes the data received from the SRC client onto the CH0 Port Interface 237C and the data from the DST client to the CH1 Port Interface 238c. The first copy operation results in a Memory Read address=0×4 to appear on channel CH0 and a Memory Write address=0×A to appear on channel CH1. The second copy operations results in a Memory Read address=0×A to appear on channel 0 and a Memory Write address=0×16 to appear on channel CH1.

When the Cache Allocator and Command Generator 237a/238a receives the first SRC operation, it consults its internal mapping table and generates a primitive cache read operation to Cache address=0×0 because it is a cache hit. On CH1, it recognizes that the DST memory address=0×A is not presently mapped in the Cache 214. In order to complete this operation, Generator 237a/238a must issue a Flush operation to update memory address=0×2E with the contents in cache address=0×6 to make room. Note that in one embodiment, that reallocation of cache addresses on CH1 237c can involve cache addresses stored on CH1 Cache 214b only. Generator 237a and 238a also issues a primitive cache write operation to cache address=0×06 to translate the original memory write from the client to an equivalent cache write.

When the memory requests for the second copy operation is received by the Cache Allocator and Command Generator 237a/238a it searches its internal mapping table and finds that memory address=0×A is mapped to cache address=0×6 in channel 1 Cache Storage B, 5b. This brings out a feature of a particular embodiment of the design, namely that instead of being completely direct-mapped (each channel can reallocate cache locations from within its own channel only), the adjacent channel will also be searched to determine if there is a cache hit. In effect, the cache has now taken on the characteristic of a 2-way set associate cache (the associatively of the cache doubles). Therefore the original memory read of address=0×A can be translated to a cache read of cache address=0×6 (originally allocated by CH1 DST client). On CH1, the DST memory write results in a cache miss, requiring cache address=0×6 to be flushed again to make room. A cache write to address=0×6 is also generated. Table 2 summarizes the client memory operations and the resulting primitive operation generated by the Cache Allocator, 2.

The generated primitive operations are dropped down the appropriate FIFOs 135 and 136 as in the 3D example but this time, the Inter-channel Cross-checking block 139 is enabled and individual operations on one channel can stall, pending the completion of one or more operations in the adjacent channel. The first cache read operation 1a for CH0 of Table 2 does not have to wait for anything (a Fill operation is not required because it is assumed that the location is already read valid). The first Flush operation 1a CH1 of Table 2 must check to make sure that there were no previous cache operations with address=0×6. In this case, there is not, so it may proceed down to the bottom of the Flush FIFO as quickly as possible. The cache write operation 1b CH1 of Table 2 must wait for operation 1a of CH1 of Table 2 flush to complete. The Fill operation on CH0 237c can be designed to wait for nothing but the cache read operation 2b for CH0 238c must wait for the CH1 cache write operation 1b to the same cache location to complete. This is an example of where 2D operations must be stalled on one channel, pending the completion of one or more operations in the adjacent channel.

The CH1 (238c) flush operation 2a, of Table 2, must wait for the CH0 (237a) cache operation 2b and for the CH1 cache operation 1b, both of Table 2, to complete before flushing and reallocating to a new memory address. Finally, the cache write operation on CH1 of Table 2 must wait for the flush operation on CH1 to complete.

As in the 3D example, the Cache Storage and Memory Interface Manager 237b/238b receives the primitive operations from the FIFOs 235 and 236 and performs the required hardware interfacing to swap data into and out of Cache 214 back to Memory 260. It also takes write data from the external client write data buses and writes to the appropriate cache location and conversely, provides read data back to the client read data buses from the appropriate cache location.

Figure 5:
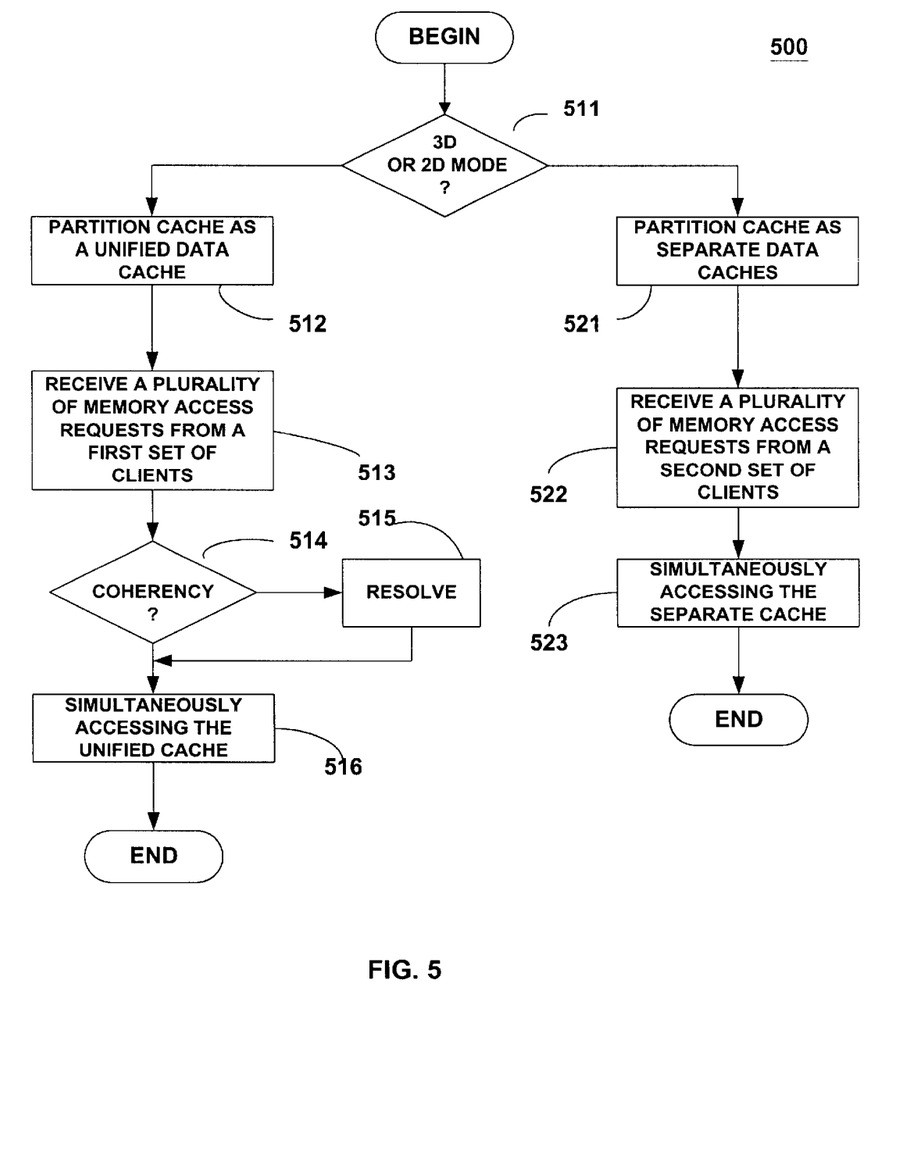
FIG. 5 illustrates a flow diagram for a method accessing cache memories in accordance with the present invention.

FIG. 5 illustrates a method 500 in accordance with the present invention. Beginning at step 511, a determination is made whether or not the system is operating in a 2D mode or a 3D mode. When it is determined that the system is operating in 2D mode, the flow proceeds to step 512. When determined that the system is operating in 3D mode, the flow proceeds to step 512.

At step 512, a cache is partitioned as a unified data cache for 2D mode operation. This corresponds to the discussions of the Cache 114 of FIGS. 1 and 2, whereby the mode is 2D mode for accessing the cache as a unified data cache. At step 513, a plurality of memory access requests are received from a first set of clients. When in 2D mode, the first set of clients includes the source client and the Z client. In addition, during 2D mode, it would be possible to access the host path

TABLE 2

2D Example Generated Primitive Operations

| SRC Memory Operation | Generated CH0 Primitive Operations | DST Memory Operation | Generated CH1 Primitive Operations |
|---|---|---|---|
| 1. Memory Read address = 0 × 4 | a) Cache Read address = 0 × 0 | 1. Memory Write address = 0 × A | a) Flush cache address = 0 × 6 to memory address = 0 × 2E b) Cache Write address = 0 × 6 |
| 2. Memory Read address = 0 × A | a) Fill cache address = 0 × 6 from memory address = 0 × A b) Cache Read address = 0 × 6 | 2. Memory Write address = 0 × 16 | a) Flush cache address = 0 × 6 to memory address = 0 × A b) Cache Write address = 0 × 6 | as indicated in FIG. 1. Also, as discussed with reference to FIGS. 1 and 2, multiple channels of memory access requests can be utilized. FIG. 1, for example, illustrates two channels of memory access requests being accessed.

Next, at step 514, a determination is made as to whether or not there is a coherency issue when multiple channels of memory access requests are issued. If a coherency problem exists, the flow proceeds to step 516, where the coherency issue is resolved. In the event where a collision occurs, i.e. both channels are attempting to access the same memory location at the same time, one channel can stall, or delay, issuing its request. In the event of a write occurring by one memory access request when the other channel has a pending read access request to the same location, the pending write request will be stalled, or otherwise delayed, until all subsequent read requests for same location have been issued. As indicated with reference to FIG. 1, it is also be possible to stop receiving data in the second channel until all reads to the same location have been resolved. If there is no coherency problem at step 514, or when any coherency problems have been resolved at step 516, the flow proceeds to step 515. At step 515, the unified cache is accessed simultaneously by multiple access requests.

At step 511, if it is determined that the video system is operating in 3D mode, the flow proceeds to step 521. At step 521, a data cache is partitioned as separate data caches. Next, at step 522, a plurality of memory access requests are received from a second set of clients. The second set of clients, when in 3D mode, would include a Z data client and a 3D destination client. In addition, the host path would have the option of overriding the Z data client. Note that it would be understood that in other embodiments the host path could override the 3D destination client, or even have its own FIFO allowing for even more channels of accesses to the memory if the memory was designed appropriately to support such a situation. Next, at step 523, the separate data caches are simultaneously accessed by the multiple channels.

Figure 6:
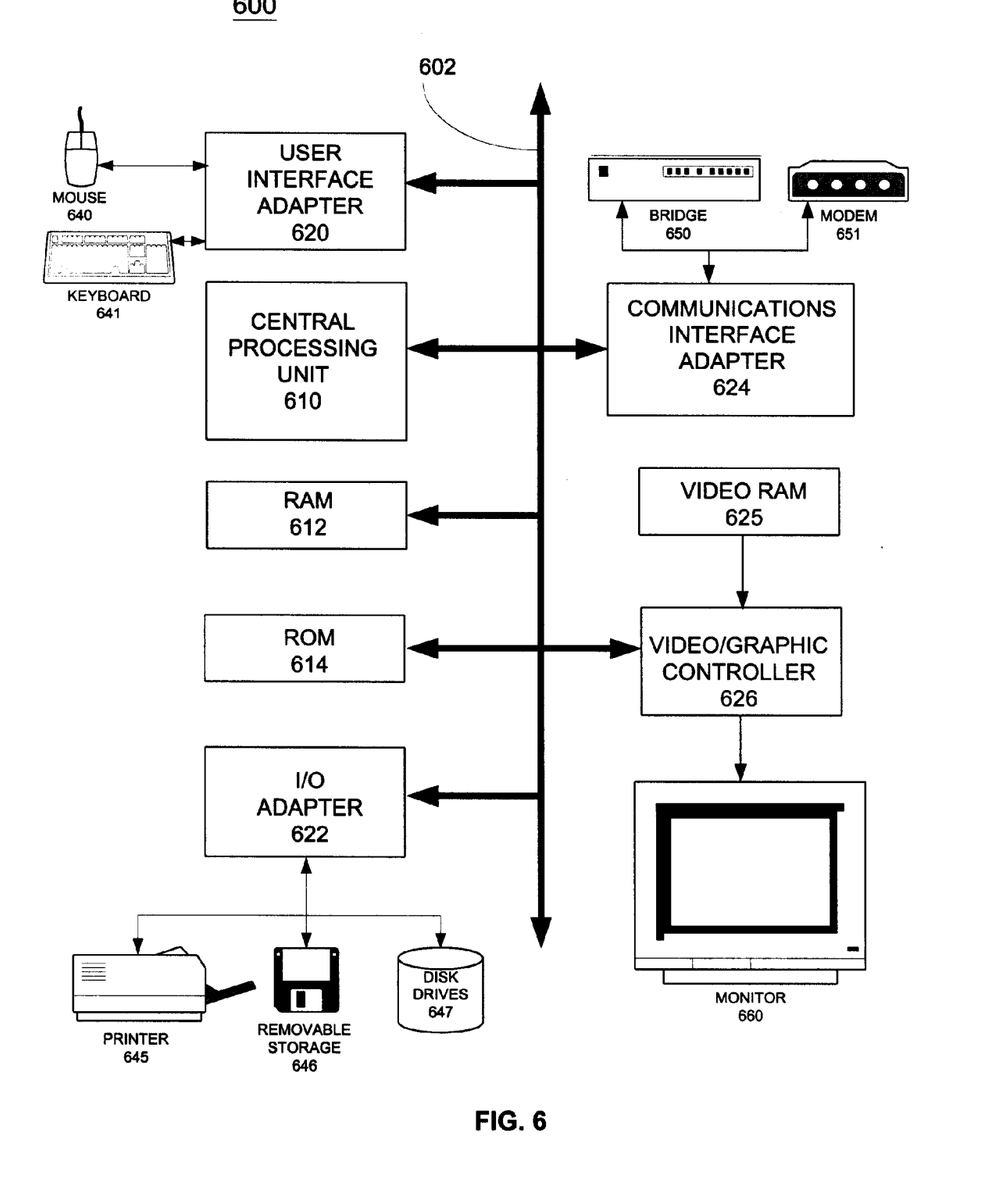
FIG. 6 illustrates, in block diagram form, a general-purpose data processing system capable of implementing the present invention.

FIG. 6 illustrates a general data processing system, such as a desk top computer, capable of incorporating the present invention. In a specific embodiment, the block diagram of FIG. 1 is implemented as part of the video graphics controller 626 of the system 600.

The system of FIG. 6 includes a central processing unit (CPU) 610, which may be a conventional or proprietary data processor, and a number of other units interconnected via system bus 602.

The other units include random access memory (RAM) 612, read-only memory (ROM) 614, and input/output (I/O) adapter 622 for connecting peripheral devices, a user interface adapter 620 for connecting user interface devices, a communication adapter 624 for connecting the system 600 to a data processing network, and a video/graphic controller 626 for displaying video and graphic information.

The I/O adapter is further connected to disk drives 647, printers 645, removable storage devices 646, and tape units (not shown) to bus 602. Other storage devices may also be interface to the bus 612 through the I/O adapter 622.

The user interface adapter 620 is connected to a keyboard device 640 and a mouse 641. Other user interface devices such as a touch screen device (not shown) may also be coupled to the system bus 602 through the user interface adapter 620.

A communication adapter 624 connected to bridge 650 and/or modem 651. Furthermore, a video/graphic controller 626 connects the system bus 602 to a display device 660.

It should be further understood that the various steps and functions described herein may actually be implemented in hardware and/or software. For example, the coherency check of step 514 may be performed by a hardware engine or in firmware, such as in micro code, executed on a processing engine associated with the system 100. In general, a system for accessing a graphics cache memory may include a processing module and memory. Such a processing may be implemented using devices, such as a data processor, or a plurality of processing devices. Such a data processors may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed above.

Where state machines or logic functions are used, electronic components and circuits known to those skilled in the art can be used to implement the individual blocks or functions of the present invention.

It should now be apparent that by providing a cache capable of being configured as either a unified cache when in 2D graphics mode, or separated into multiple caches when in 3D video mode, is advantageous. One advantage is that the video processor may have dedicated data cache portions for each client, such as Z data, in order to facilitate processing of the actual graphics information to determine the data to be rendered. Once it is determined what data is to be rendered, it can be stored into a second cache location for storing mapped display information. By maintaining separate cache portions, accesses to one cache portion will not interfere with accesses to the other cache portion. However, it is also advantageous when operating in 2D mode for both the source and destination clients to have access to the entire memory in order to facilitate basic 2D rendering functions associated with 2D graphics.

It should be appreciated that the present invention has been illustrated with respect to specific embodiments. It should further be appreciated that other embodiments may exist which do not deviate from the scope and intent of the present invention as anticipated herein.

We claim:

1. A method of accessing a video data cache, the method comprising:

receiving an application mode indicator from a host processing system, wherein the application mode indicator indicates one of a first and a second mode of application-dependent cache operation;

during the first mode of cache operation, enabling a first portion of the video data cache to be simultaneously accessible to one or more clients via both a first data access stream and a second data access stream and enabling a second portion of the video data cache to be simultaneously accessible to one or more clients via both the first data access stream and the second data access stream;

during the second mode of cache operation, partitioning the video data cache such that the first portion is accessible to one or more clients via the first data access stream and inaccessible to one or more clients via the second data access stream and such that the second portion of the video data cache is accessible to one or more clients via the second data access stream and inaccessible to one or more clients via the first data access stream.

2. The method of claim 1 further comprising the step of:

during the second mode of cache operation, receiving a first memory access request from a first client and receiving a second memory access request from a second client;

accessing the first portion of the video data cache based on the first memory access request; and simultaneously accessing the second portion of video data cache based on the second memory access request.

3. The method of claim 2, wherein the first portion of the video data cache operates as a two-way set associative cache for the first client and the second portion of the video data cache operates as a two-way set associative cache for the second client.

4. The method of claim 1, wherein during the second mode of cache operation, a first client is a 3D video destination client and a second client is either of a Z video client and a video host client.

5. The method of claim 1 wherein the first mode of cache operation is a 2D graphics application mode and the second mode of cache operation is a 3D graphics application mode.

6. An apparatus for accessing a video data cache comprising:

means for receiving an application mode indicator from a host processing system, wherein the application mode indicator indicates one of a first and a second mode of application-dependent cache operation;

means coupled to the video data cache and responsive to the application mode indicator, for enabling during the first mode of cache operation a first portion of the video data cache to be simultaneously accessible to one or more clients via both a first data access stream and a second data access stream and enabling a second portion of the video data cache to be simultaneously accessible to one or more clients via both the first data access stream and the second data access stream, and means for partitioning the video data cache during the second mode of cache operation such that the first portion of the video data cache is accessible to one or more clients via the first data access stream and inaccessible to one or more clients via the second data access stream and such that the second portion of the video data cache is accessible to one or more clients via the second data access stream and inaccessible to one or more clients via the first data access stream.

7. The apparatus of claim 6 further comprising:

means for receiving, during the second mode of cache operation, a first memory access request from a first client and receiving a second memory access request from a second client;

means, responsive to the first memory access request, for accessing the first portion of the video data cache based on the first memory access request; and means, responsive to the second memory access request, for simultaneously accessing the second portion of video data cache based on the second memory access request.

8. The apparatus of claim 7, wherein the first portion of the video data cache operates as a two-way set associative cache for the first client and the second portion of the video data cache operates as a two-way set associative cache for the second client.

9. A method of accessing a video data cache, the method comprising:

determining an application mode indicator in response to a type of graphics being generated in a video graphics system, wherein the application mode indicator indicates one of a 2D graphics application mode and a 3D graphics application mode of cache operation;

during the 2D graphics application mode of cache operation, enabling a first portion of the video data cache to be simultaneously accessible to one or more clients via both a first data access stream and a second data access stream and enabling a second portion of the video data cache to be simultaneously accessible to one or more clients via both the first data access stream and the second data access stream;

during the 3D graphics application mode of cache operation, partitioning the video data cache such that the first portion is accessible to one or more clients via the first data access stream and inaccessible to one or more clients via the second data access stream and such that the second portion of the video data cache is accessible to one or more clients via the second data access stream and inaccessible to one or more clients via the first data access stream;

whereby said video data cache supports operation of both 2D and 3D graphics applications.

10. A video system comprising:

a video graphics controller for providing a graphics application mode signal in response to the type of graphics being generated, a video data cache operable in one of a first and a second mode of application-dependent cache operation in response to the graphics application mode signal;

wherein in a first mode of cache operation, a first portion of the video data cache is enabled to be simultaneously accessible to one or more clients via both a first data access stream and a second data access stream and a second portion of the video data cache is enabled to be simultaneously accessible to one or more clients via both the first data access stream and the second data access stream; and wherein in a second mode of cache operation, the video data cache is partitioned such that the first portion is accessible to one or more clients via the first data access stream and inaccessible to one or more clients via the second data access stream and such that the second portion of the video data cache is accessible to one or more clients via the second data access stream and inaccessible to one or more clients via the first data access stream.

11. The system of claim 10 wherein the first mode of cache operation is a 2D graphics application mode and the second mode of cache operation is a 3D graphics application mode.

12. The system of claim 10 further comprising:

a first cache controller, coupled between the video data cache and one or more clients in the first data access stream, the first cache controller providing access to both the first and second portions of the video data cache during the first mode of cache operations and access to the first portion of the video data cache in the second mode of cache operation; and a second cache controller, coupled between the video data cache and one or more clients in the second data access stream, the second cache controller providing access to both the first and second portions of the video data cache during the first mode of cache operations and access to the second portion of the video data cache in the second mode of cache operation.

13. The system of claim 12 further comprising:

a first FIFO coupled between the first cache controller and one or more clients in the first data access stream; and a second FIFO coupled between the second cache controller and one or more clients in the second data access stream.

* * * * *